March 24, 1931. J. W. JANZEN 1,798,088

OPEN GLASS BOX SHAPED BUILDING ELEMENT

Filed Oct. 24, 1929

Inventor:-
Jetze Willem Janzen
by
Langner, Parry, Card & Langner
Att'ys.

Patented Mar. 24, 1931

1,798,088

UNITED STATES PATENT OFFICE

JETZE WILLEM JANZEN, OF THE HAGUE, NETHERLANDS, ASSIGNOR TO NAAMLOOZE VENNOOTSCHAP: GLASFABRIEK "LEERDAM," VOORHEEN JEEKEL, MIJNSSEN & CO., OF LEERDAM, NETHERLANDS

OPEN GLASS BOX-SHAPED BUILDING ELEMENT

Application filed October 24, 1929, Serial No. 402,115, and in the Netherlands July 18, 1928.

Open glass box-shaped building-elements are already known in various embodiments. The term "box-shaped" signifies the shape of parallelepipedon open at one side. Amongst these known building-elements there are e. g. the known glass tiles for floors (of the Keppler-type) in which the depending walls are provided with grooves in the exterior surface, which grooves at the place of the ribs merge into each other, so that a continuous groove is formed. In such a groove and in that of an adjacent glass tile a reinforcement and mortar are then placed. Glass building-elements are also known, in which the upper side, i. e. the side located opposite the open end, is provided with a raised portion, in such a manner that the next element, which is placed upon this former element, may embrace the said raised portion with the lower ends of the upstanding walls. It will be clear that walls made of glass stones of this kind in the case of fracture of one or more elements will give rise to difficulties, when replacing the broken stones by new ones.

The invention relates to an open box-shaped glass building-element, having grooves for receiving mortar and the invention consists in this that the grooves are arranged in U-formation and that all the grooves are parallel to the surfaces adapted to form the wall surfaces of a wall made of these building-elements, while the surfaces in which the grooves are arranged, have such a profile that two building-elements placed upon or against each other may be removed from each other in the direction of the plane, passing through the extreme bounds of the said profile.

It is now possible to superpose the said building-elements with mortar in the grooves without meeting with the above mentioned difficulties in the case of fracture of elements. Moreover with a glass building-element of this type the special effect is obtained that the joint-mortar and consequently the joints are less visible by reason of the fact that the groove is located in the wall thickness.

The invention will be more fully understood with reference to the accompanying drawings, illustrating it by way of example.

Figure 1:
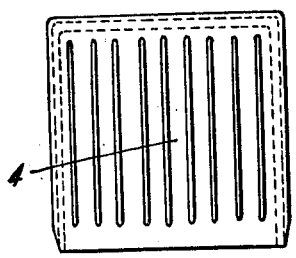
Fig. 1 is a side elevation of a glass building-element according to the invention.
Figure 2:
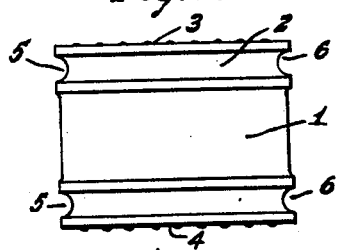
Fig. 2 is a plan view of the building-elements according to the invention.
Figure 3:
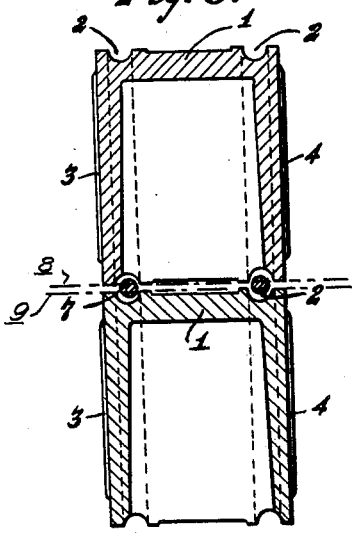
Fig. 3 is a vertical section of superposed building-elements according to the invention.

As appears from the drawing each building-element is box-shaped and open at one end, the lower end in Fig. 3. In the outer side of the upper wall there are grooves 2, which are parallel to the wall surfaces 3 and 4 respectively and merge into downwardly running grooves 5 and 6 respectively which are also parallel to the said wall surfaces. Thus inverted U-shaped grooves are obtained. 7 in Fig. 3 indicates a horizontal reinforcement, while 8 and 9 indicate the planes, passing through the extreme bounds of the profile of the surfaces comprising the grooves.

I claim:

A glass wall comprised of superposed, open, glass, box-shaped building elements, the glass elements being interlocked with respect to the wall, the top face of each element being substantially uninterrupted, the side walls and the upper face of each element having two grooves therein, each groove being adjacent the exterior walls of the element, the inner, lower end of each exterior wall being cut away to conform with the groove defined by a cut away portion at the bottom of each side wall, the said grooves so defined being arranged one on each side of the lower end of each element and forming continuations of the grooves on the side walls of the elements, reenforcing elements arranged along the horizontal grooves so formed between adjacent building elements comprising the wall, the reenforcing elements being arranged substantially centrally of the grooves, midway between the element surfaces defining the groove, and mortar in said grooves and interlocking the reenforcing elements and the adjacent building elements.

In testimony whereof, I affix my signature.

JETZE WILLEM JANZEN.